US006667126B1

(12) United States Patent
Landes et al.

(10) Patent No.: US 6,667,126 B1
(45) Date of Patent: Dec. 23, 2003

(54) HIGH TEMPERATURE FUEL CELL

(75) Inventors: Harald Landes, Rückersdorf (DE);
Franz Richter, Neunkirchen am Brand (DE); Hermann Schichl, Lauf/Pegnitz (DE)

(73) Assignee: Fraunhofer-Gesellschaft zur Foerderung der Angewandten Forschung e.v., Munich (DE)

( * ) Notice: Subject to any disclaimer, the term of this patent is extended or adjusted under 35 U.S.C. 154(b) by 0 days.

(21) Appl. No.: 09/398,690

(22) Filed: Sep. 20, 1999

Related U.S. Application Data

(63) Continuation of application No. PCT/DE98/00660, filed on Mar. 5, 1998.

(30) Foreign Application Priority Data

Mar. 20, 1997 (DE) .......................... 197 11 684

(51) Int. Cl.⁷ .............................. H01M 4/86; H01M 8/12
(52) U.S. Cl. ............................................ 429/40; 429/33
(58) Field of Search ............................... 429/30, 32, 33, 429/40

(56) References Cited

U.S. PATENT DOCUMENTS

| 5,413,880 A | 5/1995 | Ishii et al. ................. 429/33 |
| 5,670,270 A | 9/1997 | Wallin ....................... 429/33 |
| 6,013,386 A | * 1/2000 | Lewin et al. ................ 429/30 |

FOREIGN PATENT DOCUMENTS

| DE | 29 04 069 A1 | 8/1980 |
| EP | 0 510 820 A2 | 10/1992 |
| EP | 0 514 842 A1 | 11/1992 |
| EP | 0 586 264 A1 | 3/1994 |
| EP | 0 633 619 A1 | 1/1995 |
| WO | WO 96/28856 | * 9/1996 |

OTHER PUBLICATIONS

International patent Application WO 94/20998 (Bagger et al.), dated Sep. 15, 1994.
Japanese Patent Abstract No. 06096791 (Toshitaka), dated Apr. 8, 1994.
Japanese Patent Abstract JP 06243880–A, dated Sep. 2, 1994.
Japanese Patent Abstract No. 07073886 (Takao et al.), dated Mar. 17, 1995.
Japanese Patent Abstract 07006768 (Moriyoshi), dated Jan. 10, 1995.
Japanese Patent Abstract 07006774 (Moriyoshi), dated Jan. 10, 1995.
Japanese Patent Abstract 08250134 (Kazuhiro), dated Sep. 27, 1996.
Japanese Patent Abstract 08250135 (Kazuhiro), dated Sep. 27, 1996.
Japanese Patent Abstract No. 08279363 (Kazuhiro), dated Oct. 22, 1996.
J.C.C. Abrantes: "Composite Cathodes For Solid Oxide Fuel cells", Third Euro–Ceramics, vol. 2, pp. 323–328, Sep. 12, 1993.
A.J. Appleby et al.: "Fuel Cell Handbook", Van Nostrand Reinhold, New York, 1989, pp. 440–454, (Month N/A).

* cited by examiner

*Primary Examiner*—Stephen Kalafut
(74) *Attorney, Agent, or Firm*—Laurence A. Greenberg; Werner H. Stemer; Gregory L. Maybeck

(57) ABSTRACT

A high temperature fuel cell has a cathode which comprises at least a first layer and a second layer disposed on one side of the first layer, in which the first layer contains 30 to 60% by weight of a first electrolyte made up of zirconium oxide $ZrO_2$ and at least one proportion of scandium oxide $Sc_2O_3$, and the second layer comprises substoichiometric lanthanum strontium manganate having the formula $La_xSr_yMnO_3$ in which the sum of x and y is less than 1. By means of this, a high ionic conductivity is achieved for the cathode (6). The ionic conductivity further remains substantially constant as a function of the operating time t.

19 Claims, 1 Drawing Sheet

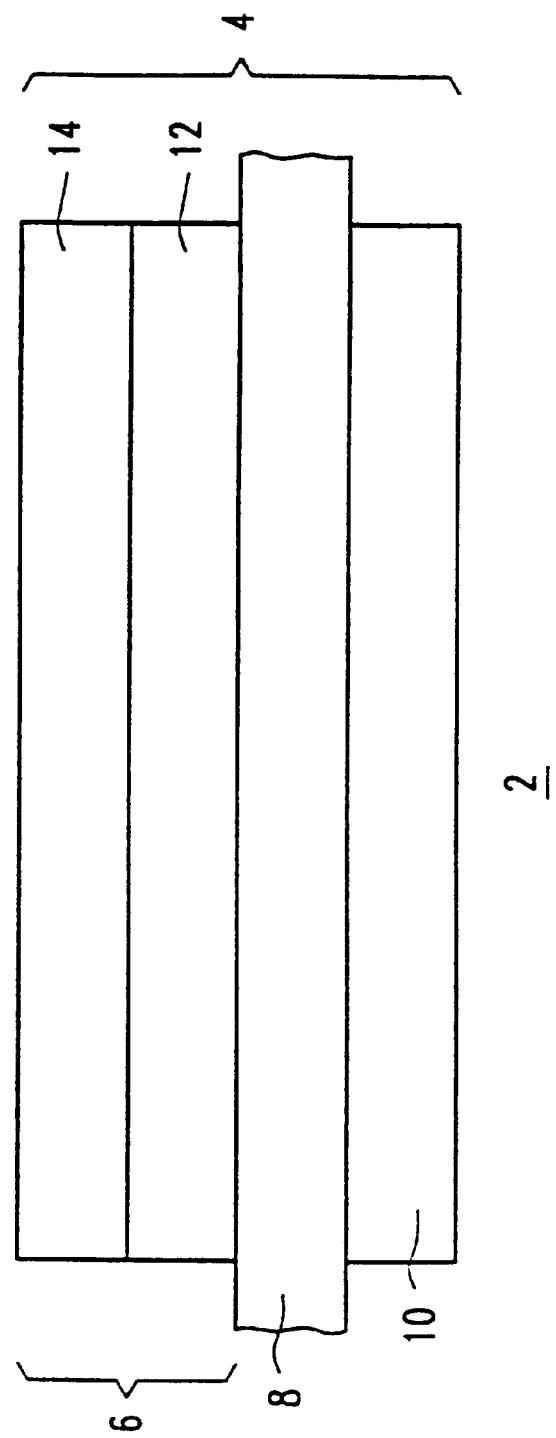

HIGH TEMPERATURE FUEL CELL

CROSS-REFERENCE TO RELATED APPLICATION

This is a continuation of copending International Application PCT/DE98/00660, filed Mar. 5, 1998, which designated the United States.

BACKGROUND OF THE INVENTION

Field of the Invention

The invention relates to a high temperature fuel cell. It is known that, during the electrolysis of water, the water molecules are decomposed by electric current into hydrogen $H_2$ and oxygen $O_2$. In a fuel cell, this process takes place in reverse. Through electrochemical combination of hydrogen $H_2$ and oxygen $O_2$ to form water, electric current is produced with high efficiency and, when pure hydrogen $H_2$ is used as combustible gas, without the emission of pollutants and carbon dioxide $CO_2$. Even with technical combustible gases, for example natural gas or coal gas, and with air (which may additionally be enriched with oxygen $O_2$) instead of pure oxygen $O_2$, a fuel cell produces considerably less pollutants and less carbon dioxide $CO_2$ than other forms of energy production which operate with fossil energy sources. The technical implementation of this principle of the fuel cell has given rise to a wide variety of solutions with different electrolytes and with operating temperatures T between 80° C. and 1000° C.

Depending on their operating temperature T, fuel cells are classified as low, medium and high temperature fuel cells, and these in turn differ in a variety of technical embodiments.

In a high temperature fuel cell stack made up of a large number of high temperature fuel cells (a fuel cell stack also being abbreviated to "stack" in the specialist literature) at least one protective layer, a contact layer, an electrolyte electrode unit, a further contact layer, a further interconnecting conducting plate, etc. are arranged in this order under an upper interconnecting conducting plate which covers the high temperature fuel cell stack.

In such a stack, the electrolyte electrode unit includes two electrodes and a solid electrolyte, formed as a membrane disposed between the two electrodes. An electrolyte electrode unit lying between neighboring interconnecting conducting plates together with the contact layers immediately adjoining both sides of the electrolyte electrode unit constitutes a high temperature fuel cell, to which the sides of each of the two interconnecting conducting plates adjoining the contact layers also belong. This and other types of fuel cells are, for example, disclosed by the "Fuel Cell Handbook" by A. J. Appleby and F. R. Foulkes, 1989, pages 440 to 454.

The performance of the electrodes or of the electrolyte electrode unit of the high temperature fuel cell is one of the factors determining the efficiency of the entire high temperature fuel cell. The essential parameters involved in this are the rates at which the fuel is converted into electrons, ions and reaction products during the electrochemical reaction, the rate at which the fuel is transported to the site of the electrochemical reaction as well as the conductivity for electrons and ions, which are needed for the electrochemical reaction to proceed. The required electron conductivity of the anode is generally achieved using a so-called "Cermet" containing a framework of metal grains (for example nickel Ni) and a suitable filler to provide ion conductivity. An electron-conductive ceramic is generally used for the cathode, which is also ion-conductive. The two electrodes and the membrane each contain an appropriate electrolyte to provide the ion conductivity of the structure.

There is a substantial problem in achieving sufficient ion conductivity in the material of each electrode. Furthermore, this ion conductivity must be provided throughout the operating time t of the high temperature fuel cell. In order to achieve this in an electrode designed as a cathode, an electrolyte is admixed with an electrically conductive base material. For example, a lanthanum strontium manganate $La_xSr_{(1-x)}MnO_3$ may be used as the base material.

In the cathodes known from the prior art, the electrolyte of the cathode consists of a zirconium dioxide $ZrO_2$ with which a portion of yttrium oxide $Y_2O_3$ is admixed. If the electrolyte contains a zirconium dioxide $ZrO_2$ with the admixture of 8 mol % yttrium oxide $Y_2O_3$, then at an operating temperature T of approximately 850° C., the cathode has a value of about 13.3 $\Omega$cm for the ionic resistance. In an operating time t in excess of 1000 hours, this value for the ionic conductivity of the cathode deteriorates to 22 $\Omega$cm. If a 10 mol % portion of yttrium oxide $Y_2O_3$ is admixed with the zirconium dioxide $ZrO_2$, then the cathode has a higher value of approximately 17.3 $\Omega$cm for the ionic resistance. On the other hand, at an operating temperature t of approximately 850° C., this electrode material shows no aging behavior as a function of the operating time t, that is to say essentially no impairment of the value for the electrical resistance and therefore the value for the ionic conductivity of the cathode as well.

SUMMARY OF THE INVENTION

It is accordingly an object of the invention to provide a high temperature fuel cell that overcomes the above-mentioned disadvantages and that includes a cathode which has a high ionic conductivity for the cathode and substantially avoids impairment of the conductivity for the cathode with increasing operating time t.

With the foregoing and other objects in view there is provided, according to the invention, a high temperature fuel cell having a cathode which comprises at least a first layer and a second layer disposed on one side of the first layer, in which the first layer contains 30 to 60% by weight of a first electrolyte comprising zirconium oxide $ZrO_2$ and at least a portion of scandium oxide $Sc_2O_3$, and the second layer comprises substoichiometric lanthanum strontium manganate having the formula $LaSr_yMnO_3$ in which the sum of x and y is less than 1. In the formula given for substoichiometric lanthanum strontium manganate, x is in the range from 0.6 to 0.90 and y is in the range from 0.02 to 0.39, provided that the sum of x and y is in the range from 0.90 to 0.99. Preferably, x is in the range from 0.65 to 0.85 and y is in the range from 0.08 to 0.30, provided that the sum of x and y is in the range from 0.93 to 0.98.

This second layer promotes the take-off of the electric current I from the high temperature fuel cells. By using scandium oxide $Sc_2O_3$ in the first electrolyte of the cathode in accordance with this invention instead of yttrium oxide $Y_2O_3$, the value for the electrical resistance of the cathode is substantially reduced (for example halved) in comparison with the cathodes known from the prior art. The ionic conductivity is therefore at least doubled at the same time. Furthermore, the ionic conductivity is substantially constant as a function of the operating time t.

Preferably, the first electrolyte contains 8 to 13 mol % scandium oxide $Sc_2O_3$, and it is particularly preferred that the first electrolyte contain 9 to 11 mol % scandium oxide $Sc_2O_3$. This range for the scandium oxide $Sc_2O_3$ content has been experimentally found to be optimal for improving the ionic conductivity of the cathode.

In a further refinement according to the invention, the first electrode contains approximately 10 mol % scandium oxide $Sc_2O_3$. At an operating temperature T of approximately 850° C., the ionic resistance has a value of about 6.2 Ωcm. Comparison with an electrolyte which contains 10 mol % yttrium oxide $Y_2O_3$ instead of scandium oxide $Sc_2O_3$ and has an ionic resistance of approximately 17.3 Ωcm shows that the ionic resistance is reduced at least by a factor of 2 when using 10 mol % scandium oxide $Sc_2O_3$. The first electrolyte containing scandium oxide $Sc_2O_3$ shows essentially no increase in ionic resistance as a function of operating time t for at least 1000 hours. The value of the ionic conductivity is therefore improved by at least a factor of 2 in comparison with the cathodes of the prior art.

Preferably, the first layer also contains 40 to 70% of a lanthanum strontium manganate which can be represented by the formula $La_xSr_yMnO_3$ as the electrically conductive base material for the admixture of the first electrolyte.

In particular, the lanthanum strontium manganate $LaSr_yMnO_3$ is preferably substoichiometric, that is to say the sum of x and y is less than 1, with the values of x, y, and the sum of x and y within the ranges given above and usually, but not necessarily, identical with the values of x, y, and their sum characterizing the substoichiometric lanthanum strontium manganate of the above-mentioned second layer. Differences if any, between the first layer and the second layer in the values of x and y are preferably small in order to minimize undesired diffusion of lanthanum or strontium between the layers.

By using substoichiometric lanthanum strontium manganate $LaSr_yMnO_3$ in accordance with this invention, the undesirable formation of lanthanum zirconate is substantially avoided and impairment of the ionic conductivity is therefore prevented.

In a further refinement according to this invention, in the lanthanum strontium manganate $LaSr_yMnO_3$, x is approximately equal to 0.78 and y approximately equal to 0.20. These values for x and y have proved advantageous in practice. Preferably, the electrolyte contains up to 2.5 mol % aluminum oxide $Al_2O_3$. Scandium Sc has virtually the same ionic radius as zirconium Zr, which leads to only minor lattice distortion and consequently to satisfactory ionic conductivity. The stability of this structure is increased even further by the addition of aluminum oxide $Al_2O_3$.

When the high temperature fuel cell contains an electrolyte electrode unit which comprises the cathode, an anode and a membrane arranged between the two, the membrane preferably contains zirconium oxide $ZrO_2$ with an 8 to 13 mol % portion of scandium oxide $Sc_2O_3$. The membrane of the electrolyte electrode unit, in other words the material at the site of the electrochemical reaction, preferably contains the same components as the first electrolyte of the cathode. The ionic conductivity of the membrane is thereby additionally improved, and the coefficient of thermal expansion is further matched to that of the material of the cathode.

The anode preferably contains 40 to 70% by weight nickel Ni and 30 to 60% by weight of a second electrolyte, which comprises zirconium oxide $ZrO_2$ with an 8 to 13 mol % portion of scandium oxide $Sc_2O_3$. The ionic conductivity of the anode is thereby improved in comparison with the anodes known from the prior art.

Other features which are considered as characteristic for the invention are set forth in the appended claims.

Although the invention is illustrated and described herein as embodied in a high temperature fuel cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE represents a schematic cross-section of a high temperature fuel cell.

DESCRIPTION OF THE PREFERRED EMBODIMENTS

According to the FIGURE, a high temperature fuel cell 2 comprises a solid electrolyte electrode unit (unit 4). The unit 4 consists of a cathode 6, a membrane 8 and an anode 10, which are disposed in this order above one another or below one another. The unit 4 is disposed between two interconnecting conducting plates (not shown) for supplying the unit 4 with fuel.

The cathode 6 comprises a first layer 12 and a second layer 14, the first layer 12 being adjacent the membrane 8. The first layer 12 of the cathode 6 consists of 30 to 60% by weight of a first electrolyte and 40 to 70% by weight of a commercially pure lanthanum strontium manganate $LaSr_yMnO_3$, preferably a substoichiometric lanthanum strontium manganate in which the sum of x and y in the formula is less than 1. The first electrolyte contains zirconium oxide $ZrO_2$ with an 8 to 13 mol % portion of scandium oxide $Sc_2O_3$. Preferably, the portion of scandium oxide $Sc_2O_3$ in the first electrolyte is 9 to 11 mol %, in particular approximately 10 mol %.

Preferably, the proportion of scandium oxide $Sc_2O_3$ in the first electrolyte is 9 to 11 mol %, in particular approximately 10 mol %. Lanthanum zirconate if present in the first electrolyte can lead to impairment of the ionic conductivity of the cathode 6. The formation of lanthanum zirconate is, however, substantially avoided by using substoichiometric lanthanum strontium manganate $LaSr_yMnO_3$, that is to say the sum of x and y is less than 1. Preferably, x is equal to 0.78 and y is equal to 0.20. Further, 1 mol % of aluminum oxide $Al_2O_3$ is admixed with the first electrolyte of the cathode 6 in order to stabilize the lattice structure.

The thickness of the first layer 12 of the cathode 6 is 35 $\mu$ (more generally, between 5 and 50 $\mu$m). As a result, sufficient electrochemical activity of the cathode 6, and therefore the overall high temperature fuel cell 2, at operating temperatures T of between 750 and 850° C. is assured.

The second layer 14 adjacent to the first layer 12 consists of a substoichiometric lanthanum strontium manganate $LaSr_yMnO_3$. The thickness of the second layer 14 is at least 10 $\mu$m and can be up to 100 $\mu$m. Sufficient electrical conductivity of the cathode 6 is thereby obtained.

The membrane 8, which is disposed between the cathode 6 and the anode 10, consists of a zirconium oxide $ZrO_2$ with an 8 to 13 mol % portion of scandium oxide $Sc_2O_3$. The membrane 8 of the unit 4, that is to say the material at the site of the electrochemical reaction, preferably consists of the same components as the first electrolyte of the cathode 6, possibly in somewhat modified concentrations. The ionic conductivity of the membrane 8 is thereby improved in comparison with the membranes known from the prior art, and the coefficient of thermal expansion is also matched to that of the material for the cathode 6.

The anode 10 consists of 30 to 60% by weight of a second electrolyte and 40 to 70% by weight nickel Ni, the second electrolyte containing zirconium oxide $ZrO_2$ with an 8 to 13 mol % portion of scandium oxide $Sc_2O_3$. The ionic conductivity of the anode 10 of the unit 4 is thereby improved in comparison with the anodes known from the prior art.

By using scandium oxide $Sc_2O_3$ in the first electrolyte of the first layer 12 of the cathode 6, instead of yttrium oxide $Y_2O_3$, the ionic resistance of the cathode is at least halved in comparison with the cathodes known from the prior art. Further, the ionic conductivity remains substantially constant as a function of the operating time t of the high temperature fuel cell 2, that is to say no impairment upon aging of the first electrolyte is to be observed.

We claim:

1. A high temperature fuel cell having a cathode substantially avoiding impairment of the conductivity for the cathode with increasing operating time, which comprises at least a first layer and a second layer disposed on one side of the first layer, in which the first layer contains 30 to 60% by weight of a first electrolyte, said electrolyte comprising zirconium oxide $ZrO_2$ and at least a portion of scandium oxide $SC_2O_3$, and the second layer comprises substoichiometric lanthanum strontium manganate having the formula $LaSr_yMnO_3$ in which the sum of x and y is less than 1.

2. The high temperature fuel cell according to claim 1, in which the first electrolyte contains 8 to 13 mol % scandium oxide $Sc_2O_3$.

3. The high temperature fuel cell according to claim 1, in which the first electrolyte contains 9 to 11 mol % scandium oxide $Sc_2O_3$.

4. The high temperature fuel cell according to claim 1, in which the first electrolyte contains approximately 10 molt scandium oxide $SC_2O_3$.

5. The high temperature fuel cell according to claim 1, in which the first layer contains 40 to 70% by weight of a lanthanum strontium manganate $La_xSr_yMnO_3$.

6. The high temperature fuel cell according to claim 5, in which the lanthanum strontium manganate of the first layer is a substoichiometric lanthanum strontium manganate having the formula $La_xSr_yMnO_3$ in which the sum of x and y is less than 1.

7. The high temperature fuel cell according to claim 6, in which x in the formula of lanthanum strontium manganate $La_xSr_yMnO_3$ is approximately equal to 0.78 and y approximately equal to 0.20.

8. The high temperature fuel cell according to claim 1, additionally comprising a portion of up to 2.5 mol % aluminum oxide $Al_2O_3$ in the first electrolyte.

9. The high temperature fuel according to claim 8, in which the portion of aluminum oxide $Al_2O_3$ is 1 mol %.

10. The high temperature fuel cell according to claim 1, in which the thickness of the first layer is in the range from 5 to 50 $\mu$m.

11. The high temperature fuel cell according to claim 1, in which the thickness of the first layer is approximately 35 $\mu$m.

12. The high temperature fuel cell according to claim 1, in which the thickness of the second layer is in the range from 10 to 100 $\mu$m.

13. The high temperature fuel cell according to claim 1, in which the electrolyte has an ionic resistance of maximum 10 $\Omega$cm at an operating temperature T of 850° C.

14. The high temperature fuel cell according to claim 13, in which said ionic-resistance of maximum 10 $\Omega$cm at an operating temperature T of 850° C. is maintained for at least 1000 hours.

15. The high temperature fuel cell according to claim 1, including a unit which comprises the cathode, an anode and a membrane disposed between said anode and said cathode, and containing zirconium oxide $ZrO_2$ with a portion of 8 to 13 mol % scandium oxide $Sc_2O_3$.

16. The high temperature fuel cell according to claim 15, in which the anode contains 30 to 50% by weight nickel Ni and 30 to 60% by weight of a second electrolyte which contains zirconium oxide $ZrO_2$ with a proportion of 8 to 13 mol % scandium oxide $SC_2O_3$.

17. The high temperature fuel cell according to claim 15, in which the first layer and the second layer of said cathode contain substoichiometric lanthanum strontium manganate.

18. The high temperature fuel cell according to claim 15, in which said membrane contains zirconium oxide $ZrO_2$ with a portion of 8 to 13 mol % scandium oxide $Sc_2O_3$.

19. The high temperature fuel cell according to claim 15, in which said anode contains zirconium oxide $ZrO_2$ with an 8 to 13 mol % portion of scandium oxide $Sc_2O_3$.

* * * * *